United States Patent
La Greca et al.

(10) Patent No.: US 11,420,896 B2
(45) Date of Patent: Aug. 23, 2022

(54) COBALT-BASED ALLOY WITH A HIGH RESISTANCE AT HIGH TEMPERATURES, SPINNER FOR THE PRODUCTION OF MINERAL FIBERS COMPRISING SAID ALLOY AND PROCESS FOR THE PRODUCTION OF MINERAL FIBERS WHICH USES SUCH A SPINNER

(71) Applicant: STM TECHNOLOGIES S.R.L., Milan (IT)

(72) Inventors: Marco La Greca, Calvenzano (IT); Roberto Massini, Calvenzano (IT)

(73) Assignee: STM TECHNOLOGIES S.R.L., Milan (IT)

( * ) Notice: Subject to any disclaimer, the term of this patent is extended or adjusted under 35 U.S.C. 154(b) by 290 days.

(21) Appl. No.: 16/763,706

(22) PCT Filed: Nov. 6, 2018

(86) PCT No.: PCT/EP2018/080254
§ 371 (c)(1),
(2) Date: May 13, 2020

(87) PCT Pub. No.: WO2019/096619
PCT Pub. Date: May 23, 2019

(65) Prior Publication Data
US 2020/0299177 A1    Sep. 24, 2020

(30) Foreign Application Priority Data
Nov. 20, 2017 (IT) .......................... 102017000132513

(51) Int. Cl.
C22C 19/07 (2006.01)
C03B 37/04 (2006.01)
C22F 1/10 (2006.01)

(52) U.S. Cl.
CPC ............ *C03B 37/047* (2013.01); *C22C 19/07* (2013.01); *C22F 1/10* (2013.01)

(58) Field of Classification Search
CPC .................................. C22C 19/07; C22F 1/10
See application file for complete search history.

(56) References Cited

U.S. PATENT DOCUMENTS

| 4,618,474 A | * | 10/1986 | Ohe ........................ C22C 19/07 |
| | | | 420/586 |
| 5,422,072 A | | 6/1995 | Mitsuhashi et al. |
| 6,068,814 A | | 5/2000 | Kang et al. |
| 2010/0244310 A1 | | 9/2010 | Bernard et al. |

FOREIGN PATENT DOCUMENTS

| JP | S60262935 A | 12/1985 |
| WO | 2009/071847 A1 | 6/2009 |

OTHER PUBLICATIONS

International Search Report and Written Opinion for International Application No. PCT/EP2018/080254 (15 Pages) (dated Jan. 24, 2019).

* cited by examiner

*Primary Examiner* — Jessee R Roe
(74) *Attorney, Agent, or Firm* — Lucas & Mercanti, LLP

(57) ABSTRACT

The present invention relates to a metal alloy, characterized in that it comprises, in percent by weight on the total weight of the alloy, 1-4% of niobium (Nb), 0-0.5% of hafnium (Hf), 27-29% of chromium, 1-5% of nickel (Ni), 0.3-0.45% of carbon (C), 0-2% of tantalum (Ta), 0-2% of titanium, 1-3% of iron, less than 0.5% of manganese (Mn), less than 0.3% of silicon (Si), less than 0.2% of zirconium (Zr), the remainder being cobalt (Co) and unavoidable impurities. This metal alloy has superior mechanical strength characteristics at high temperature which make it suitable for the manufacture of a manufactured article, in particular a spinner, for the production of mineral fibers, such as glass fiber, rock fiber and the like.

16 Claims, No Drawings

COBALT-BASED ALLOY WITH A HIGH RESISTANCE AT HIGH TEMPERATURES, SPINNER FOR THE PRODUCTION OF MINERAL FIBERS COMPRISING SAID ALLOY AND PROCESS FOR THE PRODUCTION OF MINERAL FIBERS WHICH USES SUCH A SPINNER

CROSS-REFERENCE TO RELATED APPLICATIONS

This application is a 371 of PCT/EP2018/080254, filed Nov. 6, 2018, which claims the benefit of Italian Patent Application No. 102017000132513, filed Nov. 20, 2017.

FIELD OF APPLICATION

According to its more general aspect, the present invention relates to a novel metal alloy which has a high mechanical strength at very high temperatures.

In particular, the present invention relates to a cobalt-based alloy which has a high mechanical strength at high temperatures which makes it suitable for use in the production of mineral fibers such as, in particular, glass fibers, rock fibers and the like.

The present invention also relates to an article of manufacture such as, in particular, a spinner suitable for use in the production of mineral fibers as well as a process for the production of such an article of manufacture.

The present invention also relates to a process for the production of mineral fibers such as, in particular, glass fibers, rock fibers and the like, which uses said spinner.

PRIOR ART

As is known, the production of mineral fibers, such as glass fibers, rock fibers and the like is typically performed by means of an internal centrifugal process which consists in pouring a mineral material melt (for example molten glass) into a rotor which is known as a "spinner" operating at high speeds of rotation, the spinner being provided with a peripheral strip (or disk) provided with a plurality of small holes. Owing to the centrifugal force, the melt is projected against the perforated peripheral strip from which primary filaments of molten mineral material emerge through the holes, said filaments being in turn stretched to form thin fibers owing to the action of a high-temperature gas supplied by an annular burner which surrounds the disk.

Since spinners operate in extremely demanding conditions, in particular high centrifugal forces and high temperatures of up to or even in excess of 1200° C., they are subject to major heat stress, for example thermal shock during the process start-up and stoppage steps, major mechanical stress (high centrifugal forces and erosion by the flow of mineral material) and also major chemical stress due to oxidation and corrosion by the molten material and the high-temperature gases which are emitted from the burner around the spinner.

The effects of such stress cause a gradual deterioration of the spinner which may occur in various forms such as, for example, hot creep deformation of the vertical walls, formation of fissures and/or erosion-induced wear in the region of the holes, etc. and this, ultimately, leads to replacement of the damaged components.

Therefore, it is necessary that the materials forming the aforementioned spinners should have high mechanical strength characteristics at high temperature as well as corrosion and oxidation resistance characteristics.

In this connection various cobalt-based metal alloys which have a high mechanical strength at high temperature and which may be used for the manufacture of spinners used in the production of glass fibers are known.

For example, U.S. Pat. No. 6,068,814 describes a metal alloy which has a high mechanical strength at high temperature and which comprises 40-50% cobalt, 9-12% chromium, 9-12% nickel, 6-12% tungsten, 2.8-4.8% niobium, 0.1-0.3% zirconium, 0.6-1% carbon, 0.1-0.3% silicon, 0.1-0.3% manganese, 0.1-0.3% titanium, 0.1-0.8% vanadium, the remainder consisting of impurities which do not influence significantly its mechanical properties.

The application WO 2009/071847 describes an alloy comprising 23-34% chromium, 0.2-5% titanium, 0.5-7% di tantalum, 0.2-1.2% carbon, less than 5% nickel, less than 3% iron, less than 1% silicon and less than 0.5% manganese. This alloy is characterized in particular by a much lower nickel content compared to the prior alloys, which is said to result in a material with an improved mechanical strength and therefore increase the useful working life of the spinners made using this material.

Despite the progress achieved hitherto, there is the need for products based on mineral fibers which are increasingly more resistant to high temperatures in order to meet the demands of the market. This requires the use of mineral compositions, in particular glass compositions which may be converted into fibers at even higher temperatures, and consequently also the spinners used for this purpose must in turn have a high mechanical strength also at higher temperatures compared to conventional nickel and/or cobalt-based alloys.

The main object of the present invention is therefore that of providing a novel metal alloy which is suitable for the production of spinners to be used in the production of mineral fibers, such as glass fibers and rock fibers, and which has improved mechanical strength and corrosion resistance characteristics at high temperatures such as to satisfy the aforementioned requirements.

A further object of the present invention is to provide an article of manufacture such as, in particular, a spinner for use in the manufacture of mineral fibers which has improved mechanical strength and corrosion resistance characteristics at high temperatures.

SUMMARY OF THE INVENTION

These results are achieved primarily by a metal alloy characterized in that it comprises the following elements, in percent by weight, on the total weight of the alloy:

Niobium (Nb): 1-4%
Hafnium (Hf): 0-0.5%
Chromium (Cr): 27-29%
Nickel (Ni): 1-5%
Carbon (C): 0.3-0.45%
Tantalum (Ta): 0-2%
Titanium (Ti): 0-2%
Iron (Fe): 1-3%
Manganese (Mn): less than 0.5%
Silicon (Si): less than 0.3%
Zirconium (Zr): less than 0.2%
the remainder being cobalt (Co) and unavoidable impurities.

According to an embodiment of the invention, the metal alloy comprises Hf and the sum of the content of Nb+Hf is comprised between 1% and 4% by weight on the total weight of the alloy.

According to another embodiment of the invention, the metal alloy comprises Ta and the sum of the content of Nb+Ta is comprised between 1% and 4% by weight on the total weight of the alloy.

According to a preferred embodiment of the invention, the metal alloy comprises the following elements, in percent by weight on the total weight of the alloy:

Niobium (Nb): 3.5%
Chromium (Cr): 28%
Nickel (Ni): 1.5%
Carbon (C): 0.4%
Tantalum (Ta): 0.5%
Titanium (Ti): 1.4%
Iron (Fe): 2%
Manganese (Mn): less than 0.3%
Silicon (Si): less than 0.3%
Zirconium (Zr): less than 0.2%
the remainder being cobalt (Co) and unavoidable impurities.

The aforementioned objects are moreover achieved by an article of manufacture, such as in particular a spinner, for use in the production of mineral fibers comprising the aforementioned alloy. In accordance with the present invention this article of manufacture may be produced by means of a process which comprises the steps of:

melting under vacuum or in an at least partially modified atmosphere a mixture of the elements constituting the aforementioned alloy so as to obtain a melt and cooling said melt to a temperature such as to allow the formation of crystal grains, casting the melt in a mold, obtaining a rough article of manufacture, subjecting said rough article of manufacture to a first heat treatment at a first temperature and for a first time period such as to allow the solubilization of the carbides and then to a second heat treatment at a second temperature lower than said first temperature and for a second time period such as to allow the precipitation of the carbides, cooling to room temperature the rough article of manufacture subjected to said heat treatments, obtaining said article of manufacture, in particular a spinner.

The present invention also relates to a process for the production of mineral fibers, such as in particular glass fibers, rock fibers and the like, which uses a spinner produced as indicated above. This process comprises the steps of:

pouring a flow of molten mineral material into a spinner which is rotated, the spinner comprising an alloy as defined above and having a peripheral wall or part thereof provided with a plurality of holes;

stretching the primary filaments of molten mineral material emerging from the holes of the peripheral wall or part thereof of the spinner by means of the action of hot gas, Preferably the temperature of the molten material inside the spinner is at least 1200° C.

Further characteristic features and advantages of the present invention will become clear from the detailed description below, provided by way of a non-limiting example.

DETAILED DESCRIPTION

In the present description and in the attached claims, unless indicated differently, all the numbers which describe quantities, percentages, and so on, must be understood as being qualified in all cases by the term "about". Moreover, each range includes any combination of the minimum and maximum specific values described and includes any intermediate range within them, even though not specifically mentioned.

In the metal alloy according to the invention, cobalt represents the basic austenite structure.

Chromium is present as an austenite system component necessary for ensuring a high-temperature anti-oxidizing effect. Generally, this effect is not ensured when the chromium content is less than 27%. At the same time, the chromium causes the rapid deterioration of the mechanical strength and the hardness of the alloy when its content is greater than 29%. Therefore, in the alloy according to the invention, the chromium content is kept within the range of 27-29%.

Nickel in present in the alloy according to the invention in small amounts and helps stabilize the structure of the alloy, improving its machinability. The nickel content is preferably not greater than 5% since greater amounts increase significantly the costs of production of the alloy.

Manganese and silicon are present in the alloy in small amounts and influence decarbonation, controlling at the same time the fluidity. The content of each of these elements is kept at a value of less than 0.3% because greater amounts of one or both these elements increase the fragility and may cause cracks or fissuring during the cooling procedure following casting.

In the alloy according to the invention, niobium and titanium form carbides with the carbon present, these having the further effect of stabilizing the structure of the alloy, providing it with a high mechanical strength at high temperature, even in operating conditions above 1200° C.

The alloy according to the invention also contains niobium and may contain optionally also tantalum, both in reduced amounts, as indicated above. The presence of niobium enables the machinability characteristics of the alloy to be improved, while tantalum allows the hardness of the alloy to be increased and therefore the presence of both these elements is recommended. Preferably, when tantalum is present, it replaces partly the niobium content such that, in this embodiment, the total niobium+tantalum content is comprised within the range of values envisaged for niobium, i.e. 1-4%.

The alloy according to the invention may contain moreover hafnium in order to increase further the mechanical strength in hot conditions. Preferably, when hafnium is present, it replaces partly the niobium content such that, in this embodiment, the total niobium+hafnium content is comprised within the range of values envisaged for niobium, i.e. 1-4%.

The alloy according to the invention further comprises zirconium which is added in a small percentage amount, i.e. less than 0.1%, as deoxidizer.

The alloy according to the invention also comprises carbon which is a very important element. In fact, the carbon forms carbides with chromium, niobium and titanium, increasing the bonding force between the crystals of the structure so as to improve the breaking strength and the resistance to high temperatures.

It has been surprisingly found that an alloy produced by the combination of the elements indicated above in the respective amounts in accordance with the present invention has mechanical strength at high temperature characteristics, in particular at temperatures higher than 1200° C., superior to those of conventional nickel and/or cobalt-based alloys, while maintaining at the same time also a high oxidation and corrosion resistance.

Therefore, the alloy according to the invention is particularly suitable for use in high-temperature applications and in an oxidizing and/or corrosive environment which are typical of the current centrifugal processes used for the production of mineral fibers such as in particular glass fibers, rock fibers and the like. In these applications the alloy according to the invention may be used in particular for the manufacture of spinners which, in turn, have advantageously a longer useful working life, without suffering mechanical damage such as deformations and/or cracks and damage due to oxidization and/or corrosion such as to influence negatively the quality of the mineral fibers obtained and/or the process for the production thereof, all of this also in operating conditions where there are particularly high temperatures, for example temperatures higher than 1200° C., as required by the most recent processes for formation of mineral fibers.

Without being limited to any particular scientific theory, it is considered that the formation of carbides with chromium, niobium and titanium contributes significantly to achieving the superior mechanical strength characteristics of the alloy according to the invention, said carbides increasing the bonding force between the crystals of the alloy structure and consequently improving the breakage strength and the resistance to high temperatures. At the same time it should be noted that the alloy according to the invention is essentially devoid of tungsten, namely it does not contain tungsten or it contains it very small quantities due to unavoidable impurities. Therefore, unlike prior metal alloys, such as that described in U.S. Pat. No. 6,068,014, where the presence of tungsten carbide contributes significantly to achieving the mechanical strength at high temperature, in the alloy according to the invention it is the presence of other carbides, in particular of chromium, niobium and optionally titanium and tantalum carbides, which contributes to obtaining the superior mechanical strength characteristics at high temperature.

The alloy according to the invention may be made by melting a mixture of the constituent elements in the proportions indicated above, preferably under a vacuum or in an at least partially modified atmosphere obtained by replacing at least partially the air with an inert gas such as argon, at a temperature of between 1700° C. and 1750° C., preferably at 1730° C., followed by cooling of the melt to a temperature of between 1500° C. and 1550° C., preferably 1500° C., for example by means of air, so as to allow the formation of the crystal grains in a correct manner and subsequent casting.

Melting may be performed using techniques which are conventional per se, for example by means of induction melting.

In particular, the alloy according to the invention may be used for the production of any article of manufacture with high mechanical strength characteristics at high temperature, such as in particular a spinner for use in the production of mineral fibers.

In this connection, the molten material obtained from the melting of the mixture of the constituent elements of the alloy and subsequent cooling as indicated above is cast in a suitable mold which has the form of the desired article, preferably a mold of ceramic material, resulting in a rough article of manufacture, for example a rough spinner.

Casting may be performed in a manner conventional per se, for example may be preferably a lost wax casting in a mold of the aforementioned type, preferably under a vacuum.

Then the rough article of manufacture may be subjected to at least one finishing heat treatment. Preferably, the rough article of manufacture is subjected to a first heat treatment at a first temperature of between 1200° C. and 1250° C. for a time of between 1.5 hours and 2.5 hours so as to allow solubilization of the carbides, followed by a second heat treatment at a second temperature lower than said first temperature and ranging between 1000° C. and 1050° C. for a time of between 10 hours and 12 hours so as to allow precipitation of the carbides.

Preferably the first heat treatment is performed at a temperature of 1200° C. for 2 hours while the second heat treatment is performed at a temperature of 1000° C. for 10 hours.

At the end of the aforementioned heat treatments, the rough article of manufacture is cooled to room temperature, for example in air, obtaining a finished product.

This finished product may in turn be subjected to successive machining operations using machine tools depending on the specific application.

In particular, in the case of a spinner obtained as above intended for use in the production of mineral fibers such as glass fibers, rock fibers and the like, the spinner may be subjected to boring operations on its peripheral wall or on a part thereof (for example an annular strip or disk) so as to allow the emission of the primary filaments of the molten mineral material poured into the spinner.

These holes typically have very small dimensions, for example of between 0.4 and 1 mm and may be made for example by means of electro-beam or electro-erosion procedures using machine tools which are conventional per se.

In this connection it has been found that spinners made with the alloy according to the invention also may be easily machined employing the ordinary machine tools used in the sector concerned.

The present invention also relates to a process for the production of mineral fibers such as, in particular, glass fibers, rock fibers and the like, which uses a spinner produced as described above.

This process comprises pouring a flow of molten mineral material into a rotating spinner comprising the alloy according to the invention and stretching the primary filaments of molten mineral material emerging from the holes of the spinner peripheral wall or part thereof by means of the action of hot gas supplied by an annular burner which surrounds externally such a peripheral wall.

Advantageously, the spinner comprising the alloy according to the invention allows the machining of the molten mineral material which is to be converted into fibers even at very high temperatures, in particular at temperatures of the melt inside the spinner higher than 1200° C. for a useful period of operation equal to hundreds of hours without the spinner being subject to any mechanical or chemical damage (oxidation and/or corrosion) such as to negatively affect the production process and/or the quality of the mineral fibers obtained therefrom.

The present invention will now be described by an example of embodiment provided by way of a non-limiting example.

EXAMPLE

Using an induction melting technique in an inert atmosphere (argon) a melt with the following composition was prepared:
Niobium (Nb): 3.5%
Chromium: 28%

Nickel (Ni): 1.5%
Carbon (C) 0.4%
Tantalum (Ta): 0.5%
Titanium (Ti): 1.4%
Iron (Fe) 2%
Manganese (Mn): less than 0.3%
Silicon (Si): less than 0.3%
Zirconium (Zr): less than 0.2%
the remainder being cobalt (Co) and unavoidable impurities.

The melt was obtained by melting a mixture having the aforementioned composition at a temperature of 1730° C., was then cooled to a temperature of 1500° C. and then subjected to lost-wax casting under vacuum inside a mold of ceramic material so as to form a rough spinner.

The rough spinner was then subjected to a first heat treatment at a temperature of 1200° C. for 2 hours so as to allow the solubilization of the carbides, followed by a second heat treatment at a temperature of 1000° C. for 10 hours so as to allow precipitation of the carbides.

At the end of the aforementioned heat treatments the rough spinner was cooled in air to room temperature obtaining a finished spinner which was subsequently subjected to machining in order to form a plurality of holes with a diameter of 0.6 to 0.9 mm on a portion of its peripheral wall.

The performance of the finished spinner thus obtained was evaluated in a process for the production of glass fibers in which the temperature of the mineral composition introduced into the spinner was greater than 1200° C.

The results of the test showed that the spinner was able to operate for hundreds of hours without the quality of the glass fiber obtained from the production process being negatively affected.

The invention claimed is:

1. A metal alloy consisting of the following elements, in percent by weight, based on the total weight of the alloy:
    Niobium (Nb): 1-4%;
    Hafnium (Hf): 0-0.5%;
    Chromium (Cr): 27-29%;
    Nickel (Ni): 1-5%;
    Carbon (C): 0.3-0.45%;
    Tantalum (Ta): 0-2%;
    Titanium (Ti): 0-2%;
    Iron (Fe): 1-3%;
    Manganese (Mn): less than 0.5%;
    Silicon (Si): less than 0.3%;
    Zirconium (Zr): less than 0.2%; and
    the remainder being cobalt (Co) and unavoidable impurities.

2. The metal alloy according to claim 1, wherein the metal alloy comprises Hf and the sum of the content of Nb+Hf is between 1% and 4% by weight.

3. The metal alloy according to claim 1, wherein the metal alloy comprises Ta and the sum of the content of Nb+Ta is between 1% and 4% by weight.

4. The metal alloy according to claim 2, wherein the metal alloy comprises Ta and the sum of the content of Nb+Ta is between 1% and 4% by weight.

5. The metal alloy according to claim 4, consisting of the following elements, in percent by weight:
    Niobium (Nb): 3.5%;
    Chromium (Cr): 28%;
    Nickel (Ni): 1.5%;
    Carbon (C): 0.4%;
    Tantalum (Ta): 0.5%;
    Titanium (Ti): 1.4%;
    Iron (Fe): 2%;
    Manganese (Mn): less than 0.3%;
    Silicon (Si): less than 0.3%;
    Zirconium (Zr): less than 0.2%; and
    the remainder being cobalt (Co) and unavoidable impurities.

6. An article of manufacture for the production of mineral fibers, comprising an alloy according to claim 1.

7. The article of manufacture according to claim 6, wherein the mineral fibers are glass fibers or rock fibers.

8. A spinner for producing mineral fibers, comprising an alloy according to claim 1, said spinner having a peripheral wall or a portion thereof equipped with a plurality of holes.

9. The spinner according to claim 8, wherein the mineral fibers are glass fibers or rock fibers.

10. A process for producing a spinner for use in the production of mineral fibers, comprising:
    melting under vacuum or in at least partially modified atmosphere, a mixture consisting of the following elements, in percent by weight, based on the total weight of the mixture:
        Niobium (Nb): 1-4%;
        Hafnium (Hf): 0-0.5%;
        Chromium (Cr): 27-29%;
        Nickel (Ni): 1-5%;
        Carbon (C): 0.3-0.45%;
        Tantalum (Ta): 0-2%;
        Titanium (Ti): 0-2%;
        Iron (Fe): 1-3%;
        Manganese (Mn): less than 0.5%;
        Silicon (Si): less than 0.3%;
        Zirconium (Zr): less than 0.2%; and
        the remainder being cobalt (Co) and unavoidable impurities,
    to obtain a melt;
    cooling the melt to a temperature to allow the formation of crystal grains,
    casting the melt in a mold, and obtaining a rough article of manufacture,
    subjecting the rough article of manufacture to a first heat treatment at a first temperature and for a first time period to allow the solubilization of the carbides and then to a second heat treatment at a second temperature lower than said first temperature and for a second time period to allow the precipitation of the carbides,
    cooling the rough article of manufacture subjected to the heat treatments to room temperature, and obtaining the spinner.

11. The process according to claim 10, wherein the melting is carried out at a temperature of between 1700° C. and 1750° C.

12. The process according to claim 10, wherein the cooling of the melt is carried out at a temperature of between 1500° C. and 1550° C.

13. The process according to claim 10, wherein the first heat treatment is carried out at a first temperature of between 1200° C. and 1250° C. for a time of between 1.5 hours and 2 hours.

14. The process according to claim 10, wherein the second heat treatment is carried out at a second temperature of between 1000° C. and 1050° C., for a time of between from 10 hours to 12 hours.

15. A process for the production of mineral fibers, comprising:
    pouring a flow of molten mineral material into a spinner comprising an alloy according to claim 1, wherein the spinner has a peripheral wall or a portion thereof equipped with a plurality of holes and wherein the spinner is rotated;

stretching the primary filaments of molten mineral material coming out from the holes of the peripheral wall or part thereof of the spinner by means of the action of hot gas, wherein the temperature of the molten material inside the spinner is optionally at least 1200° C.

16. The process according to claim 15, wherein the mineral fibers are glass fibers or rock fibers.

* * * * *